Figures 1, 2:
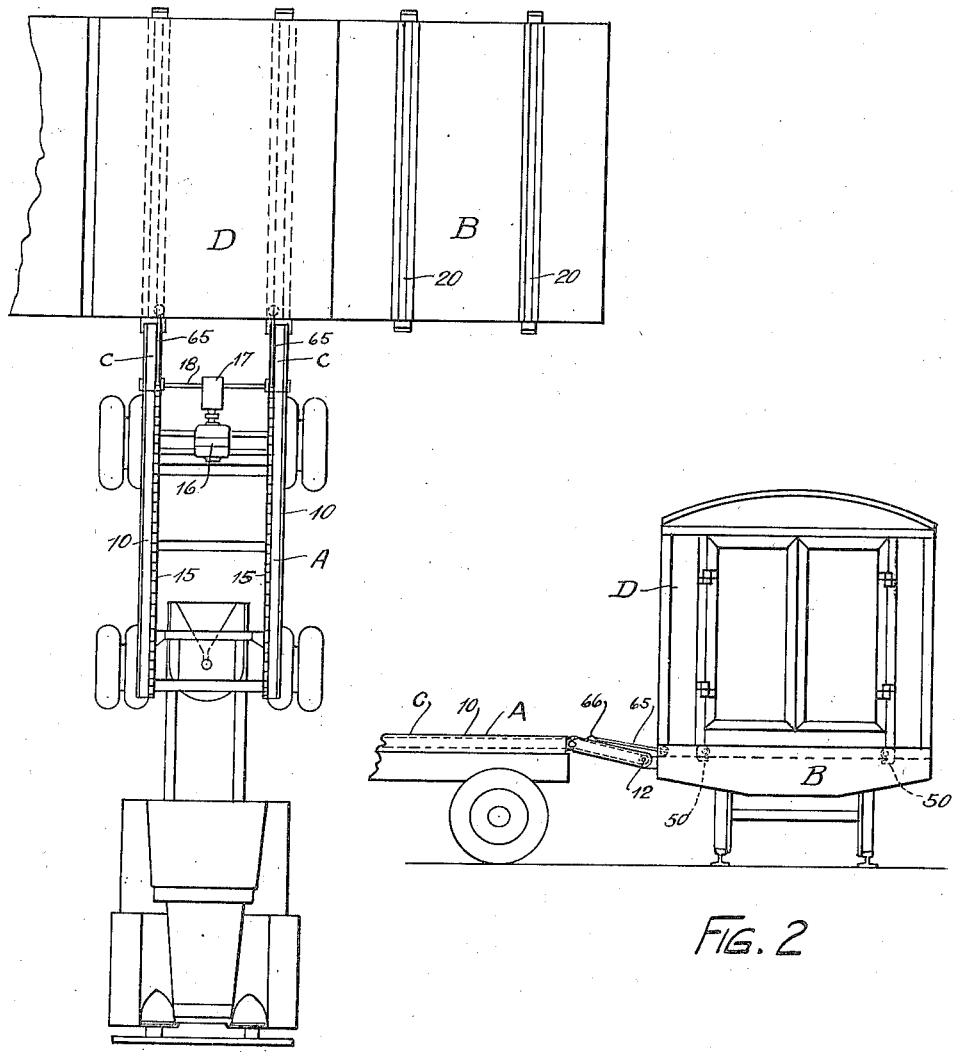

Feb. 22, 1938.   B. F. FITCH   2,108,813
LOCK CONTROLLING MECHANISM FOR TRANSFERABLE FREIGHT CONTAINERS
Filed July 18, 1935   3 Sheets-Sheet 1

INVENTOR.
Benjamin F. Fitch,
BY
ATTORNEYS.

INVENTOR.
Benjamin F. Fitch,
BY
Bates, Goldrick & Teare
ATTORNEYS.

Patented Feb. 22, 1938

2,108,813

UNITED STATES PATENT OFFICE 2,108,813

LOCK CONTROLLING MECHANISM FOR TRANSFERABLE FREIGHT CONTAINERS

Benjamin F. Fitch, Greenwich, Conn.

Application July 18, 1935, Serial No. 32,130

17 Claims. (Cl. 214—38)

This invention is concerned with a system of transferring freight employing vehicles, a demountable container, and means for transferring the container from one vehicle to the other. In such a system it is desirable to lock the container to the vehicle carrying the same. The present invention relates to means for preventing the transfer mechanism from applying moving stresses to the container when the same is locked to the supporting vehicle, whereby distortion or breakage of parts is avoided.

More particularly my invention relates to a combination of a highway truck and railway car, a container shiftable substantially horizontally from one to the other, and mechanism on the highway truck for effecting the shifting, such mechanism being suitably connected when desired to the container. My invention prevents the actual attachment of the container to the moving mechanism when the container is locked in place.

The invention may be embodied in a highway truck having a horizontally movable propelling chain, a container having skid rails adapted to be slid on the truck, means for locking such skid rails to the truck or railway car, and a push and pull bar adapted to connect the chain on the truck with the container. When so embodied, my invention provides mechanism operating automatically when the container is locked in place to prevent the attachment of such push and pull bar to the container.

The automatic prevention mechanism may also visually indicate the condition of hidden locking mechanism on the container. This is also a feature included within my invention.

A preferred embodiment of the invention as above outlined is illustrated in the drawings hereof and hereinafter more fully described.

Figure 3:
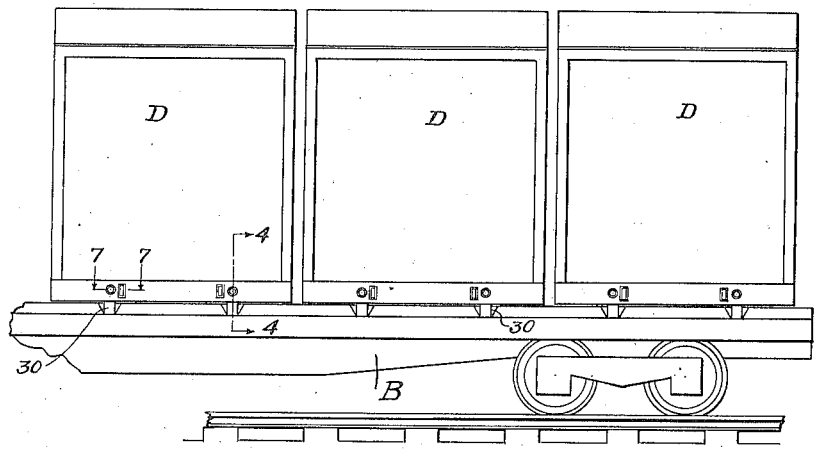
Figure 4:
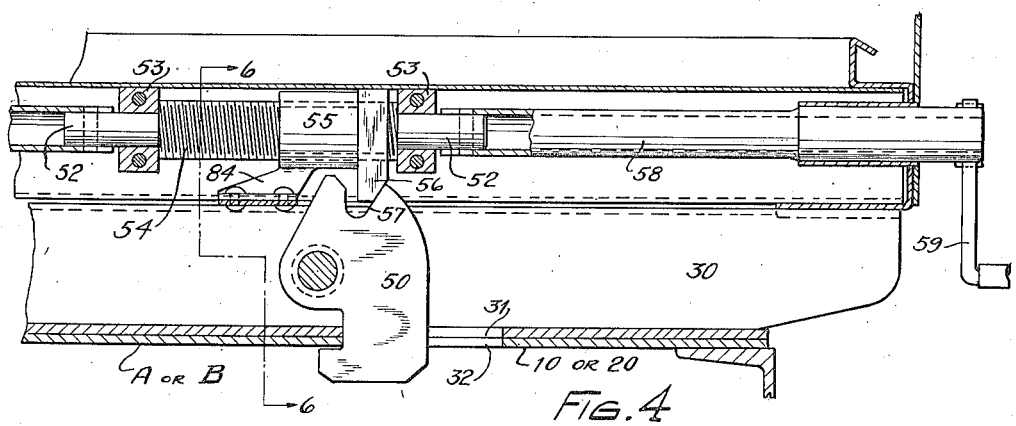
Figures 5, 6:
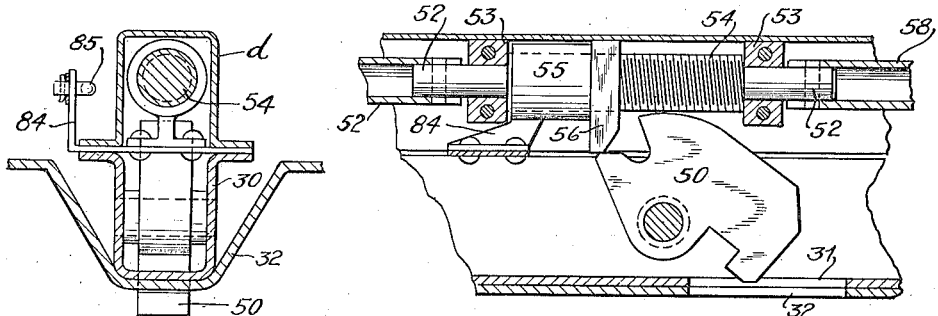
Figure 7:
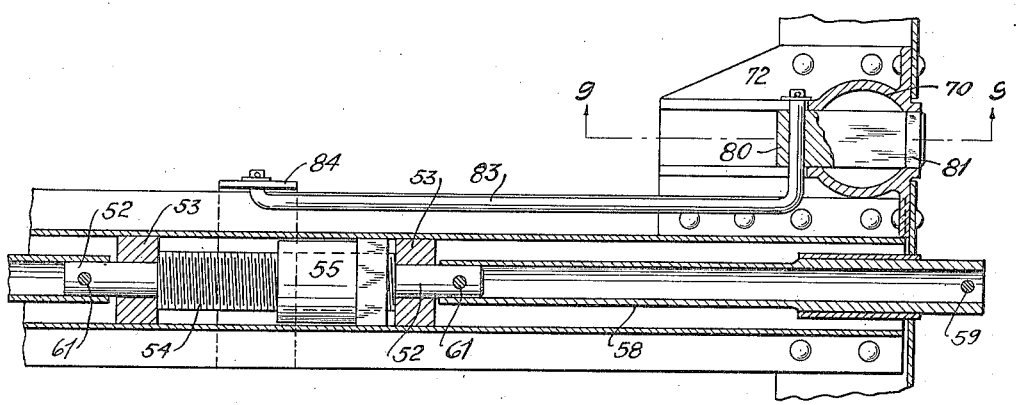
Figure 8:
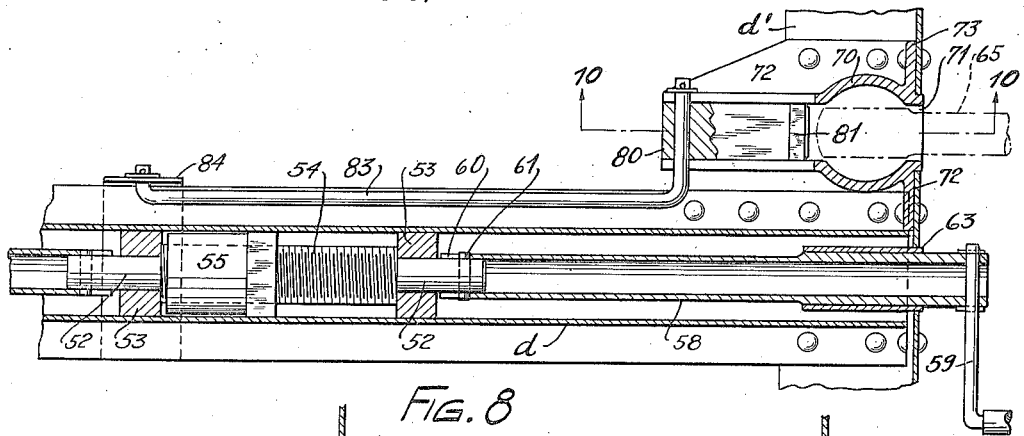
Figures 9, 10:
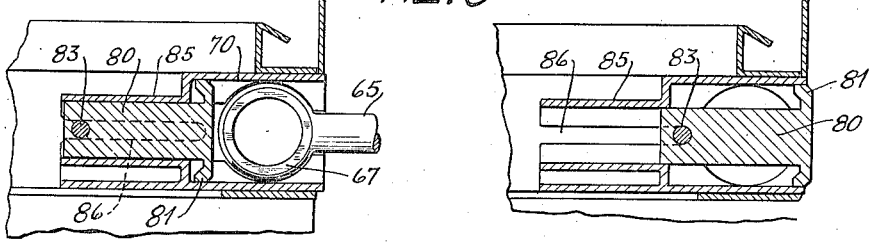
Figure 11:
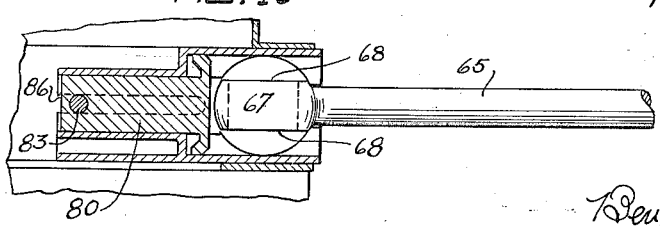

In the drawings, Fig. 1 is a plan illustrating a truck adjacent to a railway car with bridge members interconnecting the two, there being a removable body on the car ready for movement onto the truck; Fig. 2 is a fragmentary elevation of the truck and car, shown in Fig. 1; Fig. 3 is a fragmentary side elevation of the car and containers; Fig. 4 is a fragmentary vertical section as indicated by the line 4—4 on Fig. 3, but on a larger scale, and illustrates the mechanism for locking the container to the car or truck; Fig. 5 is a view similar to Fig. 4, but illustrating the locking mechanism in a different operating position; Fig. 6 is a detail in section as indicated by the line 6—6 on Fig. 4; Fig. 7 is a horizontal section as indicated by the line 7—7 on Fig. 3 and illustrates the lock operating mechanism and an adjacent anchorage device to which the body transferring means may be attached; Fig. 8 is a section similar to Fig. 7, but illustrating parts in a different position; Figs. 9 and 10 are detailed sections, as indicated by the lines 9—9 and 10—10 on Figs. 7 and 8 respectively; Fig. 11 is a sectional detail similar to Fig. 10 but illustrating the push and pull bar in a different position relative to the body.

As shown in Figs. 1 and 2, A indicates a highway truck, B a railway car, C bridge members carried by the truck and here attached to the car, and D a container adapted to be carried by either the highway truck or the car and moved from one to the other across the bridge members.

The truck shown is formed with a pair of upwardly facing longitudinal channels 10 and the railway car with correspondingly spaced channels 20 extending crosswise thereof. The body D has on its underside skid rails 30 (Figs. 3 and 4) which are adapted to occupy the channels of the truck or railway car. The bridge bars referred to, which are also upwardly facing channels, are hingedly connected at the rear end of the channels 10 and adapted to be attached at their free ends to the side of the railway car by suitable brackets and pins indicated at 12. The propelling mechanism on the truck, about to be described, is adapted to push the body from the truck across the bridge members onto the car or pull the body from the car across the bridge members onto the truck, the skid rails on the body sliding in the different channels.

The propelling mechanism on the truck shown comprises preferably a pair of endless chains 15 lying on suitable longitudinal supports on the truck. Suitable mechanism as, for instance, a motor 16, reduction gearing 17, a shaft 18 and suitable sprocket wheels driven thereby, may operate to propel the chains. These chains extend also along the upper surface of the respective bridge members passing around sprocket wheels at the free ends of the bridge members.

Push and pull bars, designated 65, are adapted to be attached to the container and to the chains, whereby the traveling chains may push the container from the truck or pull it from the car as desired. This connection, which is a feature of the present invention, will be described shortly.

To lock the body effectively to the truck or car, I provide the following mechanism. The skid rails 30 on the bottom of the body are made hollow and within each skid rail is a pair of oppositely facing hooks 50 adapted to operate through openings 31 in the bottom of the rail into keepers provided by openings 32 in the base of the truck channel 10 or the car channels 20. To operate these hooks simultaneously, I may provide in the base of the body in a housing d above the skid rail a rotatable shaft 52 mounted in suitable bearings, as 53. This shaft has right and left screw threaded portions embraced by traveling nuts slidably but non-rotatably carried by the body. Figs. 4 and 5 show the right-hand screw and the nut 55 for the right hand hook 50 of Fig. 2; the left-hand hook of that figure being associated with a left-hand nut and screw. Each nut has a downwardly projecting lug 56 which extends into a notch 57 carried by the corresponding hook 50.

It will be seen that the rotation of the shaft 52 will serve to rock the two hooks oppositely on their pivots, so that they may be swung to engage the keepers in the truck or car channels, or by the opposite movement, to be freed therefrom. I may readily rotate the shaft 52 by the insertion in alignment therewith of the tubular shank 58 of the removable crank 59, this crank shank having a notched end 60 adapted to straddle a pin 61 on the shaft 52. A suitable sleeve 63, Figs. 7 and 8, carried in the base frame opposite the end of the housing d, may form a guide for the crank shank.

The arrangement of the truck with propelling chains and the body with hollow skid rails carrying locking hooks operated as described is shown and described in my copending applications Serial No. 755,752, filed December 3, 1934, and Serial No. 32,029, filed July 18, 1935, and claimed in the latter application.

I now come to the particular features of the present invention, which are concerned with the attachment of the chain to the container, and the relation of such attachment to the locking hooks. In the embodiment shown, the attaching means comprises a push and pull bar 65, which is suitably attached to the chain and also to the body. The attachment to the chain (indicated at 66 in Fig. 2) may be in any suitable manner, for instance, by means of an eye on the bar 65 through which a pin may pass or by a hook on the end of the bar adapted to pass into an open space in the chain. The other end of the bar is made in a peculiar form and coacts with the container in a special manner, as will be now explained.

The free end of the push and pull bar 65 is formed with a partially spherical head 67, this head being cut off by parallel planes on opposite sides of the shank, as indicated at 68. The container is provided with a partially spherical socket 70 in its side wall into which the head may extend. The entrance to this socket is restricted to a rectangular opening 71, the larger dimension of which is only slightly larger than the diameter of the head and the smaller dimension of which is only slightly larger than the width of the head between the planes 68. Accordingly, by inserting this head through the opening and then giving the bar a quarter turn, the head is locked in the socket. Such locked position is the position of the bar where the other end is proper for attachment to the chain, and it follows from the construction described that attachment of the bar to the chain can be effected only when the bar is properly locked to the container. The socket described may be readily formed in the base of the container as, for instance, by a suitable casting. It is shown as having a horizontal web 72 and vertical webs 73 riveted to the correspondingly positioned parts of the base sill d' of the container.

I prevent the push and pull bar from being attached to the container whenever the container is locked in place by means of an abutment coupled with a locking mechanism and serving to obstruct the opening 71 whenever the container is locked. To effect this I provide a sliding bar 80 within the base of the container having a head 81 which is adapted to substantially fill the opening 71. This bar 80 is connected by a rod 83 to a bracket 84 which is attached to the corresponding traveling nut 55. These parts are so arranged that as the nut travels in swinging the hook into locking position, this same movement automatically causes the bar 80 to move outwardly so that the abutment plate 81 comes into the opening 71 of the socket and closes it, at the same time that the hook on the container engages the keeper on the vehicle.

The guide for the bar 80 may readily be a portion of the same casting which carries the socket. Thus, as shown in Figs. 7 and 8, this casting is formed with a hollow housing 85 substantially square in cross-section and adapted to slidably receive the bar 80. This housing may be slotted through its side walls, as indicated at 86 for the passage of the bent end of the bar 83, where it is attached to the bar 80.

It will be seen that the above described simple mechanism prevents the attachment of the push and pull bar when the container is locked in place. It also prevents setting the lock when the bar is in place. Hence, there is no possibility of straining or breaking parts by attempting to shift the container while locked.

The abutment plate 81 being readily visible at the side of the container when the container is locked forms of itself a very convenient indicator or telltale to inform the attendant that the container is locked. I recommend painting these tell-tale plates with a red color and thus the inspector may readily tell at a glance from the space at the side of the car whether the various containers on a car, for instance, are all locked thereto, ready for transportation by the car, and similar observation will be available at the end of the truck for the container thereon. In case the telltale does not stand substantially flush with the side of the body, the inspector knows that the locking is not effective and immediately the crank is applied to the end of the shaft 52 and the same rotated to effect the locking.

I claim:

1. The combination of a vehicle, a container adapted to be mounted thereon, means for locking the container to the vehicle, mechanism adapted to be attached to the container to move it substantially to or from the vehicle, and means rendered operative by locking the container to the vehicle for preventing effective attachment of said mechanism to the container.

2. The combination of a container, means for locking the same to a support, propelling mechanism, means for attaching the propelling mechanism to the container, and means actuated by the locking means for preventing such attachment when the container is locked to the support.

3. The combination of a container, propelling mechanism for the container, a strut adapted to be attached to the propelling mechanism and the container, whereby the propelling mechanism may shift the container, mechanism for locking the container in place, and mechanism operated automatically consequent upon the operation of the locking mechanism to prevent the attachment of the strut.

4. The combination of a highway truck adapted to carry a container, propelling mechanism on the truck, a strut adapted to be attached to the propelling mechanism and the container, whereby the propelling mechanism may shift the container, mechanism for locking the container in place, and mechanism operated automatically consequent upon the operation of the locking mechanism to prevent the attachment of the strut to the container.

5. The combination of a container, mechanism adapted to lock the same to a support, a socket on the container adapted to receive the head of a propelling bar, and mechanism coupled with the locking mechanism to block the entrance to the socket.

6. The combination of a container, locking hooks in the base thereof, mechanism for operating said hooks, a socket on the container adapted to receive the head of a propelling bar and mechanism coupled with the hook-operating mechanism to block the entrance to the socket.

7. The combination of a container, locking hooks adapted to lock the container to a support, a rotatable rod having screw and nut connections with the hooks, whereby they may be moved to or from locking position, a device on the container for the attachment of a push or pull bar, and mechanism operated by said rotatable rod for rendering such attaching device noneffective.

8. The combination of a container having hollow skid rails on its base, pivoted hooks in said skid rails operable through openings therein to lock the container to a support, a rotatable rod having screw and nut connections with the hooks, whereby they may be swung to or from locking position, means on the container for the attachment of a push or pull bar, and mechanism operated by said rotatable rod for preventing the attachment of the push or pull bar to the container.

9. The combination of a container, a lock therefor, a rotatable rod having a screw and nut connection with the lock, a socket carried by the container for receiving the head of a push or pull bar, a device adapted to block the socket, and connecting mechanism between the same and the traveling member of the screw and nut connection.

10. The combination of a container having hollow skid rails on its base, locking hooks pivotally mounted in said skid rails and adapted to be projected through openings therein, a rod having a screw and nut connection with the hooks whereby the rotation of the rod may swing the hooks, a socket carried by the container for receiving the head of a push or pull bar, a tell-tale device adapted to block the entrance to the socket, and connecting mechanism between the same and said rotatable rod.

11. The combination of a vehicle having a propelling mechanism, means for operating the same, a demountable container adapted to rest on the vehicle or on an adjacent support, a push or pull bar adapted to connect the propelling mechanism to the container, said bar having an elongated head adapted to pass through an elongated opening into a socket carried by the container, the bar being thereafter turnable substantially a quarter turn to lock the head within the socket, means for attaching the bar to the propelling mechanism when the bar is so locked to the socket, means for locking the container to a support, and means for blocking the entrance to the socket automatically consequent upon the operation of such locking mechanism.

12. The combination of a container, a pair of hollow skid rails on the underside thereof, a pair of pivoted hooks within each skid rail adapted to project through openings in the base of the rail to lock the container to a support, a pair of turnable shafts parallel with the adjacent skid rails, screw and nut connections between said shafts and the hooks of the skid rail, a pair of sockets in the container having elongated entrance openings, closure members for the sockets adapted to prevent entrance to the socket or be moved to idle position, connecting mechanism between said closure members and said shafts to move the closure members into active position when the container locking hooks are in their active positions.

13. The combination with a highway truck and a railway car of longitudinal channels on the highway truck, correspondingly spaced channels transversely on the railway car, movable chains on the highway truck having reaches lying parallel with the channels of the truck, a demountable container having rails at its base adapted to occupy the channels of the truck or railway car, locking hooks carried by the container and adapted to engage keepers on one of the vehicles to lock the container thereto, externally accessible mechanism for operating said hooks, struts adapted to connect the chains of the truck with the container, including sockets carried by the container which may be occupied by heads on the struts, and means operated by the locking mechanism of the container for preventing the entrance of the strut into the socket when the container is locked in position.

14. The combination of a container, mechanism adapted to lock the same to a support, a device on the container adapted to receive the end of a propelling bar, and mechanism coupled with the locking mechanism to block operative engagement of said end with said device.

15. The combination of a vehicle, a container adapted to be mounted thereon, means for moving the container, locking mechanism on the bottom of the container adapted to coact with the vehicle, a movable tell-tale on one of the sides of the container, operated by said mechanism in a manner to show when the container is locked to the vehicle, said tell-tale, when active, being arranged to block the attachment of the container moving means to the container and to permit such attachment when inactive.

16. The combination with a support, a container adapted to rest thereon, means for moving the container from the support, means for locking the container to the support, and means actuated by the locking means for automatically preventing the attachment of the moving means to the container.

17. In a load handling mechanism, the combination of a support, a container adapted to rest on the support, propelling mechanism for moving the container, a detachable connection between the propelling mechanism and the container, means for locking the container to the support, and means so constructed and arranged that the detachable connection cannot be effectively established except when the container is unlocked.

BENJAMIN F. FITCH.